United States Patent [19]

Weaver et al.

[11] 4,414,587
[45] Nov. 8, 1983

[54] SKEW SENSING FOR DIGITAL TAPE PLAYBACK

[75] Inventors: Charles S. Weaver, Palo Alto; Joseph H. Chadwick, Menlo Park; John M. Yarborough, Jr., Palo Alto; Floyd A. Brown, Mountain View; Donald J. Burch, Los Altos, all of Calif.

[73] Assignee: SRI International, Menlo Park, Calif.

[21] Appl. No.: 331,566

[22] Filed: Dec. 17, 1981

[51] Int. Cl.³ .............................................. G11B 5/43
[52] U.S. Cl. ...................................... 360/76; 360/26; 371/1
[58] Field of Search ........................ 360/76, 26; 371/1

[56] References Cited

U.S. PATENT DOCUMENTS

| | | | |
|---|---|---|---|
| 2,751,439 | 6/1956 | Burton | 360/76 |
| 2,937,239 | 5/1960 | Garber, Jr. et al. | 360/76 |
| 2,938,962 | 5/1960 | Konins et al. | 360/76 |
| 3,387,295 | 6/1968 | DeMoss | 360/71 |
| 3,414,816 | 12/1968 | Tobey et al. | 324/83 A |
| 3,526,726 | 9/1970 | Corbett et al. | 360/76 |
| 4,357,702 | 11/1982 | Chase et al. | 371/1 |

*Primary Examiner*—George G. Stellar
*Attorney, Agent, or Firm*—Victor R. Beckman

[57] ABSTRACT

A plural channel playback system comprising magnetic recording tape movable past a reproducing transducer head having at least one transducing element for each track is shown together with skew detecting means. At least two of the tracks are recorded with digital data signals comprising equal length data words with a parity bit, with the parity bits being simultaneously recorded along the tracks. Parity bit lock-on circuits are responsive to outputs from two tracks, which lock-on circuits generate word clock pulses in synchronization with the recorded parity bit signals. A phase detector responsive to word clock pulses from the parity bit lock-on circuits produces an error signal output proportional to the phase difference between said word clock pulse inputs thereto, which error signal is related to skew. The azimuthal position of the reproducing head relative to the recording tape is adjusted either manually or automatically to minimize the error signal.

17 Claims, 6 Drawing Figures

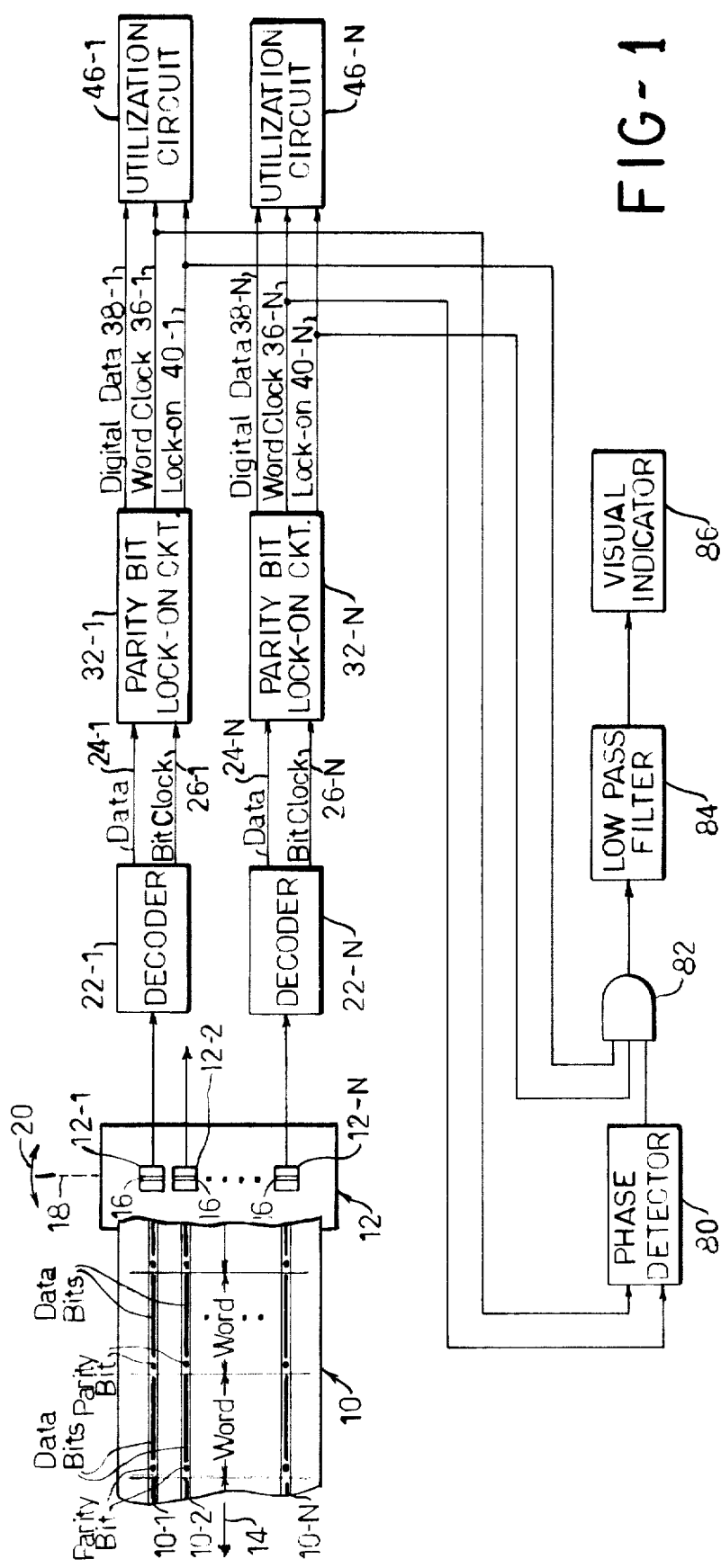
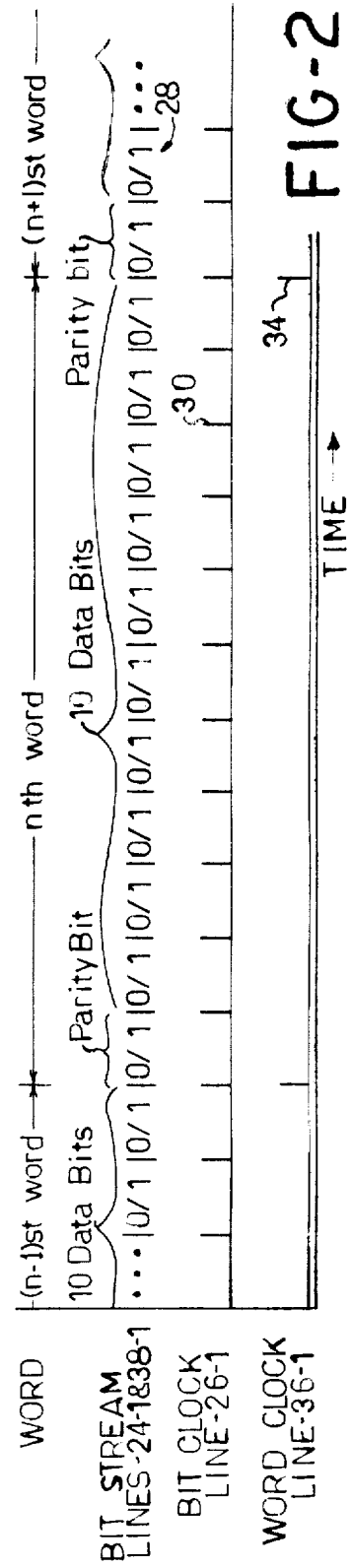

SKEW SENSING FOR DIGITAL TAPE PLAYBACK

ORIGIN OF THE INVENTION

The Government has rights to this invention pursuant to Contract Number N01-NS-3-2322.

BACKGROUND OF THE INVENTION

Apparatus for measuring skew in a tape transport is well known as disclosed, for example, in U.S. Pat. No. 3,414,816—R. Tobey et al. Servomotor systems for automatic skew control also are known as disclosed in U.S. Pat. Nos. 2,937,239—S. M. Garber, Jr. et al, 2,751,439—L. D. Burton, 3,526,726—J. P. Corbett et al, 3,387,295—D. L. DeMoss, and 2,938,962—J. A. Konins et al. Such prior art arrangements include the use of control tracks along opposite edges of the tape along which control signals are recorded during recording of desired information along intermediate tracks. The use of two tracks for control signals greatly reduces the amount of information which otherwise could be recorded on the tape if said tracks could be employed for recording data, or the like.

SUMMARY OF THE INVENTION AND OBJECTS

An object of this invention is the provision of method and means for measuring skew in a tape transport system which avoids the above and other shortcomings and disadvantages of prior art skew measuring and correction systems. An object of this invention is the provision of skew measuring method and means of the above-mentioned type which avoids the need for recording control signals along control tracks of the tape for use in measuring skew.

The above and other objects and advantages of this invention are achieved by simultaneously recording digital data comprising equal length words, each with a parity bit, along two laterally spaced tracks of a plural channel tape. During playback, data from the tracks are read by two transducing elements included in a plural channel transducing head. If the digital data is recorded in encoded form, the outputs from the two heads are decoded, and the decoded outputs are supplied to individual parity bit lock-on circuits which lock onto parity bits in the data streams. When the parity bit lock-on circuits are locked onto parity bits, word clock signals are produced at outputs therefrom which signals are supplied to a phase comparator, or detector, circuit having an analog error signal output related to the phase difference between said word clock input signals. The output from the phase detector may be supplied to a visual indicator to provide a visual indication of the phase difference between the parity bits in the data streams which, in turn, is related to skew in the tape transport. Tape transport elements such as the plural channel transducing head and/or tape guides may be manually adjusted to minimize the phase difference between the input signals to the phase detector thereby minimizing skew. Alternatively, the output from the phase detector circuit may be supplied as an error signal to a servomotor for automatic control of tape transport elements for automatic, dynamic, skew reduction.

The invention, together with other objects and advantages thereof, will be better understood from the following description when considered with the accompanying drawings.

BRIEF DESCRIPTION OF THE DRAWINGS

In the drawings, wherein like reference characters refer to the same parts in the several views:

FIG. 1 is a block diagram of a digital playback system which incorporates skew detecting means embodying the present invention;

FIG. 2 includes a graphic representation showing the format of decoder output data and bit clock pulses together with word clock pulses produced at an output from parity bit lock-on circuits included in the present system;

Figure 3:
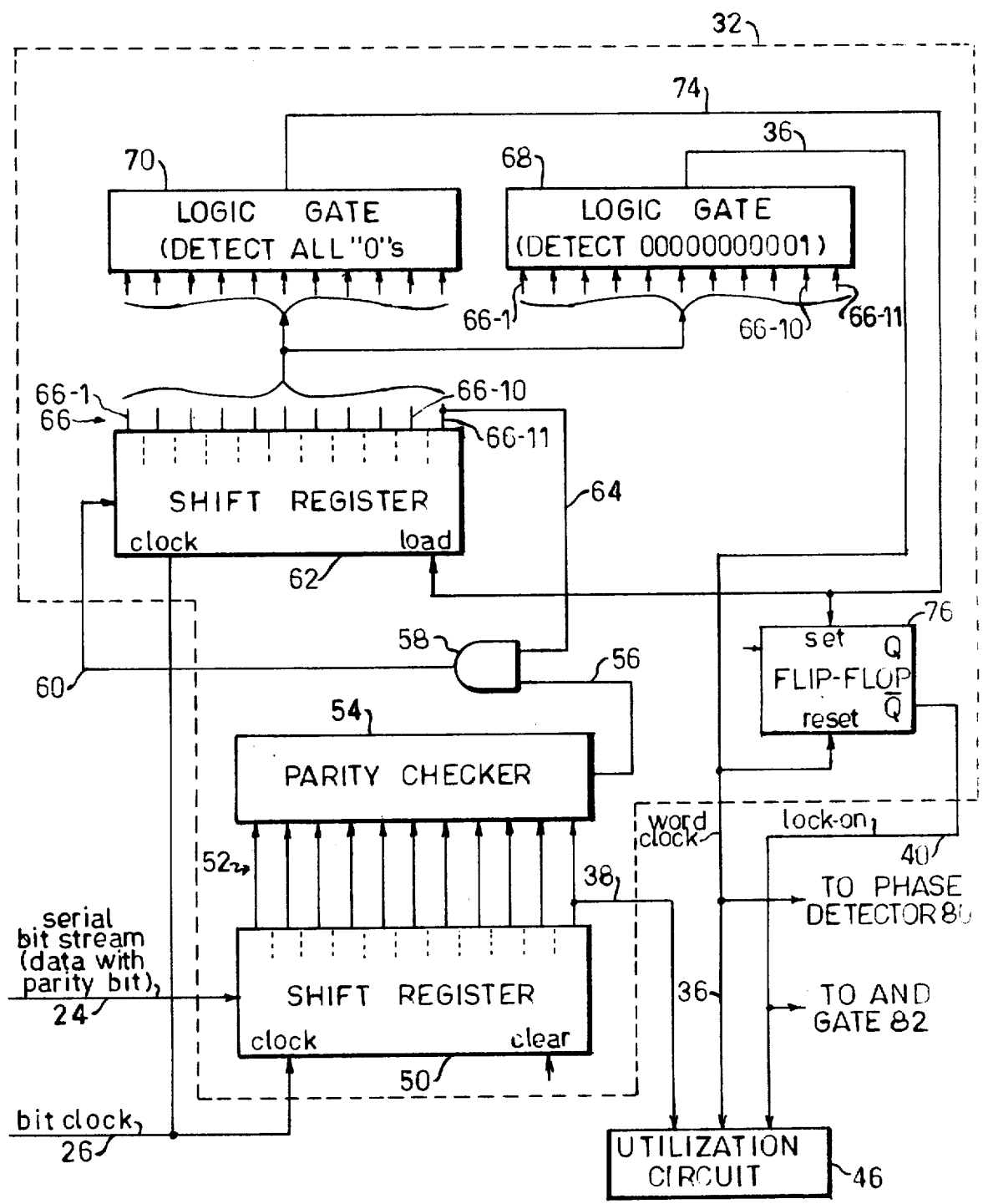
FIG. 3 is a block diagram of a parity bit lock-on circuit of a type adapted for use in the system illustrated in FIG. 1.

Reference first is made to FIG. 1 wherein a multi-track recording medium 10 and associated multi-channel transducing head 12 are shown. The recording medium may comprise magnetic tape which is driven past the transducing head in the direction of arrow 14 by means of suitable tape drive, not shown. Individual recording tracks, or channels, on the tape are identified by reference characters 10-1, 10-2 . . . 10-N, and associated transducer elements, or channels, of the transducing head are identified by reference characters 12-1, 12-2 . . . 12-N.

The transducing elements each include a non-magnetic gap 16 for reproduction of digital signals recorded along the tape tracks. Preferably, the transducing head gaps in the tape recording unit extend normal to the longitudinal direction of tape travel during simultaneous recording of the tape tracks. This angle between the non-magnetic transducer head gaps and tape direction is defined as azimuth. Skew is the angular difference between actual azimuth and 90°. If the tape is recorded with skew, then the reproducing transducer head 12 should be adjusted to the same skew position for minimum system degradation. In FIG. 1 mechanical means 18 are diagrammatically shown for use in manual adjustment of the skew angle of the transducing head 12 in the direction of double-headed arrow 20 in accordance with the output from the skew detecting means of this invention.

In the embodiment of the invention illustrated in FIG. 1, all tape tracks 10-1 through 10-N may be used for simultaneous data recording. Two of the tracks, preferably the two outer tracks 10-1 and 10-N are recorded with data which include parity bits, which parity bit values are substantially simultaneously, synchronously, recorded. In FIG. 1 the information format for tracks 10-1 and 10-N is shown to include equal-length words, each of which includes a plurality of data bits and a parity bit. With the illustrated arrrangement the parity bit preceeds the associated data bits of the word. The words for tape tracks 10-1 and 10-N are simultaneously recorded, with the parity bits being located substantially directly opposite each other along opposite edges of the tape if the recording is performed without skew. If skew is present in the recording, then parity bits along one track will precede those along the opposite track in an amount dependent upon the skew. During playback, the transducing head 11 is adjusted to the same skew angle thereby minimizing the effective head-gap width. For high density digital recording and playback, azimuthal adjustment of the transducing head 12 to adjust for skew to minimize the effective head-gap width is particularly required. Other tracks between the control tracks 10-1 and 10-N may be recorded using any desired data format, including the illustrated format, since they are not included in the skew detection scheme of this invention. In FIG. 1, track 10-2 is shown recorded with data in the same format as tracks 10-1 and 10-N.

In the arrangement illustrated in FIG. 1, the data at tracks 10-1 and 10-N comprises encoded data which is encoded using a self-bit-clocking code. Consequently, there is no requirement to include a bit clock signal on the tape for use in the subsequent decoding process. The Miller code and the Bi-Phase codes such as Bi-Phase level, Bi-Phase-Mark and Bi-Phase-Space are examples of well known self-bit-clocking codes of the type which may be employed. Data picked up by the transducing elements 12-1 and 12-N is supplied to decoders 22-1 and 22-N, respectively, for decoding and for generation of bit clock pulses. Decoded data and regenerated bit clock signals are provided at output lines 24-1 and 26-1, respectively, of decoder 22-1, and lines 24-N and 26-N, respectively, of decoder 22-N. Outputs from decoder 22-1 are depicted in FIG. 2, to which figure reference is made. Similar outputs, not shown, are obtained from decoder 22-N. The nth word together with portions of the $(n-1)^{st}$ and $(n+1)^{st}$ words at line 24-1 are shown and are identified by reference character 28. Each word of the serial bit stream comprises a plurality of data bits, here ten, together with a parity bit. In the present specification and claims, the term "word" is used to identify data bits plus the associated parity bit. Thus, with the illustrated arrangement a stream of eleven (11) bit words is shown, each of which words consists of a plurality of data bits (here 10) and a parity bit. In the illustrated arrangement, the parity bits were recorded before associated data bits and, therefore, preceed the data bits at output line 24-1 from the decoder. The parity bits could follow the data bits, or could be located at any position in the bits of the data word as desired. Bit clock pulses 30 generated by the decoder and synchronized with the stream bits are shown in FIG. 2.

The serial bit data streams 28 at lines 24-1 and 24-N from the decoders 22-1 and 22-N are supplied to parity bit lock-on circuits 32-1 and 32-N, respectively, under control of bit clock pulses 30 at lines 26-1 and 26-N. The parity bit lock-on circuits, in response to the serial bit streams clocked thereto, generate word clock pulses 34, shown in FIG. 2, at output lines 36-1 and 36-N thereof which are synchronized with data output at lines 38-1 and 38-N of the circuits. A third output, not shown in FIG. 2, is provided at lines 40-1 and 40-N from the parity bit lock-on circuits to signal when the circuit is locked onto the parity bit in the data stream. Details of a parity bit lock-on circuit for use in the present system are provided hereinbelow, which circuit is of type disclosed in U.S. patent application Ser. No. 311,783 filed October 15, 1981 entitled Digital Data Transmission with Parity Bit Word Lock-On by Charles S. Weaver and John M. Yarborough, Jr., which application is assigned to the same assignee as the present application. The entire disclosure of application Ser. No. 311,783 specifically is incorporated by reference herein.

Details of a parity bit lock-on circuit 32 of the type shown in the above-mentioned patent application, which circuit may be employed in the skew sensing system of FIG. 1, are shown in FIG. 3 to which reference now is made. The serial word stream of data bits with a parity bit at line 24 is supplied to the serial input of first shift register means 50 having a capacity of one word, here eleven (11) bits. The bit stream 28 is shifted through the shift register 50 under control of bit clock pulses 30 at clock input line 26. The serial output from the shift register is connected through output line 38 to a utilization circuit 46 for any desired use of the digital data contained therein.

The parallel output lines 52 of shift register means 50 are connected to parallel inputs of parity checker means 54 for checking parity of the eleven (11) bits contained in the register. Either even or odd parity checker means 54 is employed depending upon which parity system, i.e. an even or odd parity system, is employed. As the bit stream is shifted into register 50, parity is checked at each bit interval and, depending upon the results of the parity check a parity "true" or a parity "error" signal is produced at the output line 56 of the parity checker comprising a 1-bit or a 0-bit, respectively.

The output of parity checker 54 is connected over line 56 to one input of a logic gate 58 shown comprising an AND gate. The AND gate output at line 60 is connected to the serial input of a second shift register means 62, with the serial output from said register being connected over line 64 to the second input of said AND gate 58. The second shift register means 62 is of the same capacity as register 50, here eleven (11) bits. The shift register 62 is clocked by bit clock pulses 30 (FIG. 2) at the same rate as shift register 50. When the output from the shift register is a 1-bit, either a 1-bit or 0-bit is shifted into register 62 depending whether the output from the parity checker is a 1-bit or a 0-bit. It here will be noted that in the present description "one" and "zero" bits are not always represented by high and low signals, respectively. Thus, the "one" and "zero" signals may be represented by either a high or low signal. For an understanding of the block diagram showing of the invention of FIG. 3, it is not required that a single convention for representing the binary digits be employed.

The parallel outputs 66 from shift register means 62 are connected to first and second logic gate means 68 and 70, respectively. Output line 36 from logic gate 68 is a "one" when input lines 66-1 through 66-10 are "zeros" and line 66-11 is a "one." With any other combination of inputs, the logic gate 68 output is "zero." Output line 74 from logic gate 70 is a "one" when all input lines 66-1 through 66-11 are "zero." With any other combination of inputs, i.e. if any one or more input lines is a "one" the output from logic gate 70 is "zero."

When the parity bit lock-on circuit 32 locks onto a parity bit in the word bit stream supplied thereto, a word clock pulse synchronized with the parity bit is provided at output line 36 from the logic gate 68. The word clock pulse is supplied to the reset terminal of a flip-flop 76 to reset the flip-flop if it is in a set condition. When reset, the Q output goes to a "one" level which is connected over line 40 to the utilization circuit 46 to signal that the circuit 32 is locked onto the parity bit. The output from logic gate 70, which detects when all eleven (11) bits contained in the shift register 62 are "zeros" is connected to the load input terminal of the shift register 62 to load the same with all 1-bits.

Figure 4:
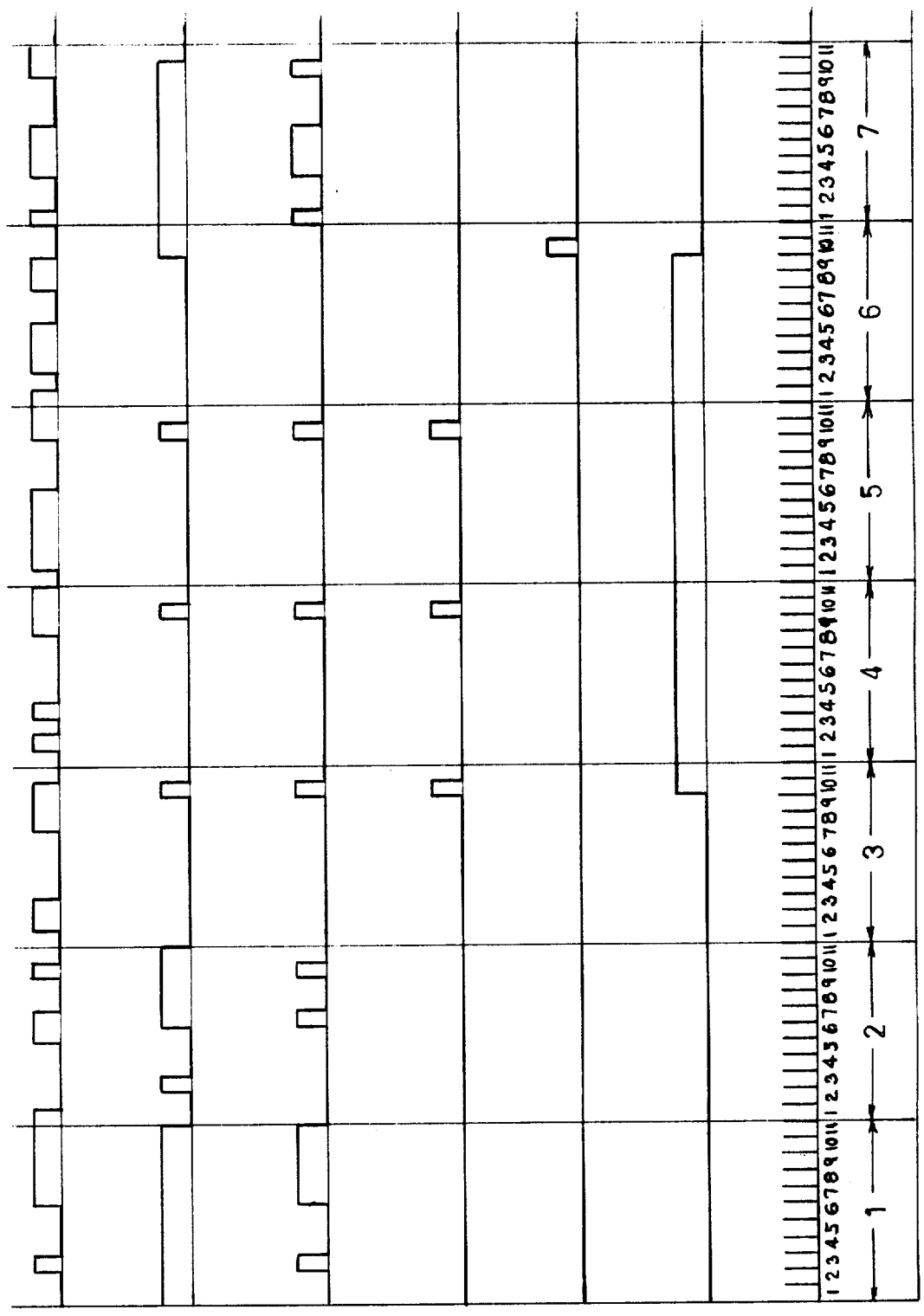
FIG. 4 shows signals appearing at various locations of the parity bit lock-on circuit shown in FIG. 3 for use in explaining operation thereof.

Operation of the parity bit lock-on circuit 32 will best be understood with reference to the waveforms of FIG. 4. Bits of the waveforms are shown divided into arbitrary bit groups 1 through 7, with each group consisting of eleven (11) bits numbered 1 through 11. Since each word in the data pulse train consists of ten (10) data bits and a parity bit, it is known that ten of the eleven bits in each group comprise data bits and one comprises the parity bit onto which the circuit locks. Until parity lock-on is achieved, it is not known which bit in the group comprises the parity bit.

Assume that the shift register 62 is loaded with all "one" bits. Consequently, as bits are clocked through the register 62, the serial output from the register at line 64 to AND gate 58 will be a 1-bit for at least the first eleven (11) bits. With a 1-bit at line 64 to the AND gate, the gate output at line 60 is a 1-bit if the parity checker output also is a 1-bit (parity true), and is a 0-bit if the parity checker output is a 0-bit (parity error). In FIG. 4, when bit number 1 of bit group 1 is shifted into data shift register 50, a parity check of the eleven bits then in the register results in a "zero," parity error, output from the parity checker 54, waveform A. As a result, the output from AND gate 58 is "zero," which output is shifted into register 62, waveform C. The next input bit is shifted into data register 50, the parity of the eleven (11) bits contained therein again is checked and, as seen at waveform A, produces a parity checker output of "zero" which is shifted into register 62 through AND gate 58. At bit number 3 of bit group 1, the parity checker output is a 1-bit, i.e. true, which "ones" signal is transferred to the input of register 62 through AND gate 58; the gate 58 being enabled by the "ones" output from shift register 62 at this time, as seen at waveform B. As seen in FIG. 4, waveform A, parity checker outputs of "zero" are produced when checking the contents of data register 50 when bits 1, 2, 4, 5 and 6 are shifted into the register, and parity checker outputs of "one" (i.e. parity true) are produced when bits 3, 7, 8, 9, 10, and 11 are entered into register 50. Now, at bit 1 of bit group 2, the output from shift register 82 is "zero" (waveform B) whereby one input to AND gate 58 is "zero" for "zero" output from the gate which is entered into the shift register 62. In this case, regardless of the output from the parity checker 54, a "zero" at the serial output of the register 62 results in a "zero" being entered into the register. Essentially, then, it will be seen that parity is checked, and the result of such parity checking is entered into register 62, only so long as prior integral multiple groups of bits have produced parity "true" outputs.

Upon shifting all of the group 1 bits into data register 50, on the average, parity will check true for one half the parity checks. In the illustrated arrangement parity checked true when the six bits 3, 7, 8, 9, 10 and 11 of group 1 were entered. Now, as group 2 bits are shifted into the data register 50, parity is, essentially, checked only upon entry of bits 3, 7, 8, 9, 10 and 11, for which parity checked true during parity checking of corresponding group 1 bits. Of these group 2 bits, a parity checker output of "zero" is produced when bits 3, 8, 9 and 11 are entered into the data register, and a parity checker output of "one" is produced when bits 7 and 10 are entered (see waveform A). These "zeros" and "ones" are entered into shift register 62 through AND gate 58. For all other bits, a "zero" is reentered into register 62 since the output from register 62 is "zero." Now as group 3 bits are entered into the data register 50, parity is, essentially, checked only as bits 7 and 10 are entered. From waveform A, it will be seen that the parity bit generator output is zero at bit 7 of group 3 whereby a "zero" is entered into shift register 62. Now, shift register 62 contains a single "ones" bit, here bit 10, while the remainder are "zero" bits. When this "ones" bit is shifted into the final stage of register 62, an output is obtained from logic gate 68, waveform D, which is synchronized with the parity bit. Output from logic gate 68 resets flip-flop 76 (waveform F) to signify that parity bit lock-on is achieved. A "ones" bit is reinserted into the shift register 62 so long as the parity checker output is true, i.e. is a "one" when the single "ones" contained in shift register 62 is located at the last register stage. Parity checking occurs every eleven bits at which time the logic gate 68 produces a "ones" output if parity is true.

If, after lock-on, parity fails to check, i.e. if the parity generator output is "zero" when the parity bit is checked, the AND gate 58 output is "zero" which "zero" is entered into the shift register 62. Now, every stage of shift register 62 is loaded with a "zero" bit, whereupon a "one" output is produced by logic gate 70, waveform E. As noted above, this output sets flip-flop 76, waveform F, to indicate that circuit 32 no longer is locked onto the parity bit. The output from logic gate 70 also is supplied as a load signal to shift register 62 to load the register with all "ones." The operation continues, in the manner described above, until only a single "ones" bit is contained in the shift register 62 at which time a word-clock is produced at the output of logic gate 68 every time the "ones" bit reaches the final stage of the register.

Returning now to the description of the skew detecting system of FIG. 1, it will be seen that the word clock pulses at lines 36-1 and 36-N from the parity bit lock-on circuits 32-1 and 32-N are connected to the inputs of a phase detector 80. Phase detector 80 produces an output signal having a duty cycle proportional to the phase difference between the two input word clock streams. The phase detector output is connected through a control gate 82 to the input of a low pass filter 84. Control signals for controlling the gate 82 are supplied by the word lock-on signals from the parity bit lock-on circuits 32-1 and 32-N over lines 40-1 and 40-N, respectively. When both parity bit lock-on circuits 32-1 and 32-N are locked onto parity bits in the data streams, outputs at lines 40-1 and 40-N enable the gate 82 for passage of the phase detector output to the low pass filter 84. When either, or both, parity bit lock-on circuits are not locked onto the parity bits, gate 82 is inhibited thereby preventing the phase detector output from reaching the low pass filter 84, in which case a zero level signal is supplied to the input of the low pass filter.

In the arrangement shown in FIG. 1, the output from the low pass filter 84 is supplied to visual indicating means 86 such as a meter, lamp, or the like, to provide a visual indication of the filtered output from the phase detector 80. The time period required for the parity bit lock-on circuits 32-1 and 32-N to lock onto parity bits in the data streams is short compared to the time constant of the low pass filter 84 whereby the effect of loss of lock-on is negligible so long as the parity error rate is low. In FIG. 1, the transducing head 12 is manually pivotally adjusted relative to the tape 12 to provide an output at the indicating means 86 indicative of zero phase difference in the word clock stream inputs to the phase detector 80 for skew compensation. If the magnitude of the phase detector 80 output is proportional to the phase difference, then the playback head 12 would be adjusted for minimum at the indicating means 86. Generally, a single adjustment of the playback transducing head is sufficient to match playback skew with skew during recording of the tape for static skew correction.

Figure 5:
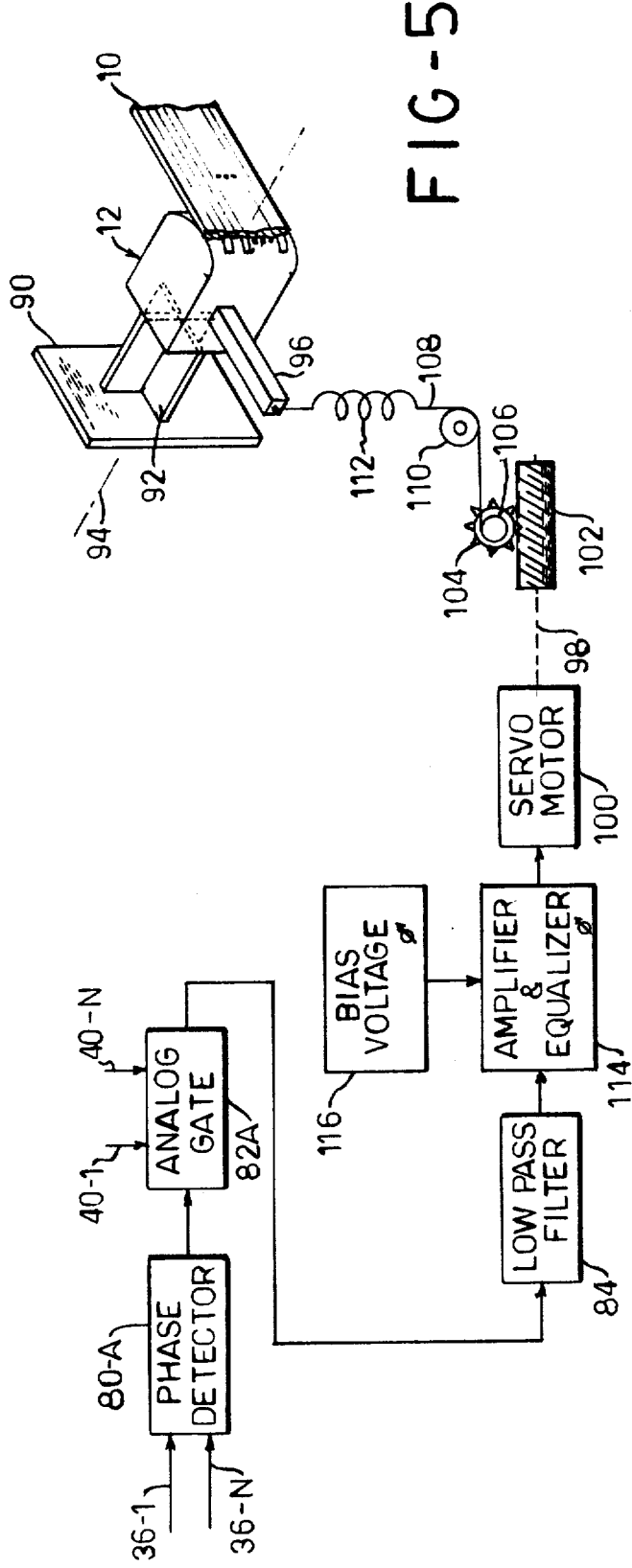
FIG. 5 is a fragmentary block diagram showing automatic skew adjusting means adapted for use with the skew detecting means of FIG. 1.

It will be apparent that the above-described skew sensing means may be incorporated in an automatic skew adusting circuit for dynamic skew correction. Referring to FIG. 5, the transducing head 12 is shown attached to a mounting plate 90 through an "X" shaped mounting member 92 which resists bending, but is relatively easily twisted about its longitudinal axis 94. An arm 96 extending generally radially from the head 12 is connected to the output shaft 98 of a servomotor 100 for application of torque to the transducing head 12 for skew control relative to the tape 10. The mechanical connection between the motor and transducing head includes a worm 120 attached to the servomotor shaft for drive of a worm wheel 104. A drum 106 is secured to the worm wheel to which one end of a cable 108 is attached. The cable passes over a pulley 110 and is attached at the other end to the arm 96 through a spring 112.

The amount of torque applied to the transducing head 12, and resultant rotation about mounting axis 94, is controlled by the servomotor 100 which is connected to the output from the low pass filter 84 through an amplifier and equalizer circuit 114. A variable d-c bias voltage source 116 is supplied to the amplifier and equalizer circuit 114 of the servo circuit to provide a torque on the transducing head for zero skew adjustment in the absence of an input signal to the amplifier from the low pass filter 84.

In the arrangement of FIG. 5, a phase detector 80A is employed of the type which has an output having a polarity dependent upon phase sense, i.e. leading or lagging, and a magnitude proportional to the phase difference. Word clock inputs are supplied to the phase detector for the parity bit lock-on circuits 32-1 and 32-N over lines 36-1 and 36-N, respectively. The phase detector output is connected through an analog gate 82A to the input of the low pass filter 84. Operation of the analog gate 82A is under contol of lock-on signals from the parity bit lock-on circuits 32-1 and 32-N supplied thereto over lines 40-1 and 40-N, respectively. When both circuits 32-1 and 32-N are locked onto parity bits in the bit streams supplied thereto, outputs at lines 40-1 and 40-N, enable the gate 82A for passage of the phase detector output to the low pass filter 84.

Although the operation of the automatic skew control system is believed to be apparent from the above description, a brief description of the operation now will be provided. During recording of the tape 10, data bits are recorded along the two outer tracks in the formats illustrated in FIG. 1. The information signals comprise equal-length words, each of which comprises a plurality of data bits together with a parity bit. With no skew in the recording apparatus, the parity bit signals are recorded directly opposite each other on the tape. For high density recording, digital signals to be recorded are first encoded using a code that requires a minimum amount of bandwidth, such as the Miller code. As is well understood, Miller encoded signal level transitions occur 1, 1½ and 2 time units apart depending upon bit combinations being encoded. In practice, parity bits are simultaneously appended to words of the two data streams to be recorded along the outer tracks of the tape, and these words which include the parity bits are simultaneously encoded and recorded.

The Miller encoded signals recorded along the outer tracks are picked-up by transducer elements 12-1 and 12-N of the transducing head 12 and supplied to Miller decoders 22-1 and 22-N, respectively, for decoding thereof. Since the Miller code is a self-clocking code, bit clocks are obtained at output lines 26-1 and 26-N from the decoders, along with the data bit streams at lines 24-1 and 24-N thereof. The general format of the word bit stream and the bit clock from the decoders is shown at 28 and 30 respectively in FIG. 2.

As is well understood, in the decoding of Miller encoded signals and simultaneous bit clock generation, the bit clock pulses are not generated at a uniform rate. Instead, there is jitter in the bit clock stream supplied to the parity bit lock-on circuits 32-1 and 32-N from the respective decoders 22-1 and 22-N which results in jitter in the word clock signals 34 at word clock output lines 36-1 and 36-N of said parity bit lock-on circuits. The effects of such jitter are substantially eliminated from the output of the skew detection circuit by inclusion of the low pass filter 84 in the output from the phase detector 80A.

The decoded digital data and bit clock signals from the decoders 22-1 and 22-N are supplied to the parity bit lock-on circuits 32-1 and 32-N which, when locked onto the parity bits, generate word clock signals at output lines 36-1 and 36-N in synchronization with parity bits, and produce lock-on signals at output lines 40-1 and 40-N, respectively. (See waveforms D and F of FIG. 4.) When both parity bit lock-on circuits 32-1 and 32-N are locked onto parity bits in the associated data stream, the lock-on signals therefrom enable gate 82A. The phase detector 80A has an error signal output proportional to the phase difference in the word clock streams supplied thereto from the parity bit lock-on circuits 32-1 and 32-N, which error signal is connected through enabled gate 82A to low pass filter 84. The filtered phase detector output is amplified and equalized at amplifier and equalizer 114, and supplied to the motor 100 which is mechanically coupled to the transducing head 12 for azimuthal control thereof to minimize the phase difference in the word clock outputs from the parity bit lock-on circuits 32-1 and 32-N.

If parity bit lock-on is lost by either parity bit lock-on circuit 32-1 or 32-N, gate 82A is disabled by application of a "zero" signal to one of the inputs thereto over line 40-1 or 40-N. With the gate 82A disabled, the input to low pass filter 84 is zero whereupon the filter output gradually settles toward zero during the parity search period. As noted above, the parity search period is short compared with the time constant of the low pass filter 84 so that the effect on the servosystem operation is negligible if the error rate is low.

Digital data supplied to the inputs of the parity bit lock-on circuits 32-1 and 32-N is shifted through the data registers 50 (FIG. 3) and supplied over output lines 38-1 and 38-N to utilization circuits 46-1 and 46-N, respectively, (FIG. 1). Word clock pulses form the parity bit lock-on circuits are connected over lines 36-1 and 36-N to the utilization circuits for word synchronization. Lock-on signals to the utilization circuits from the parity bit lock-on circuits over lines 40-1 and 40-N serve to disable the same during the search for parity bit lock-on. With the present arrangement, it will be apparent that all tracks of the multitrack tape 10 may be employed for digital data recording for maximum information storage. As noted above, prior art arrangements often include separate control signal tracks along which control signals are recorded for exclusive skew measurement and/or control use, thereby eliminating use of such tracks for data recording.

Figure 6:
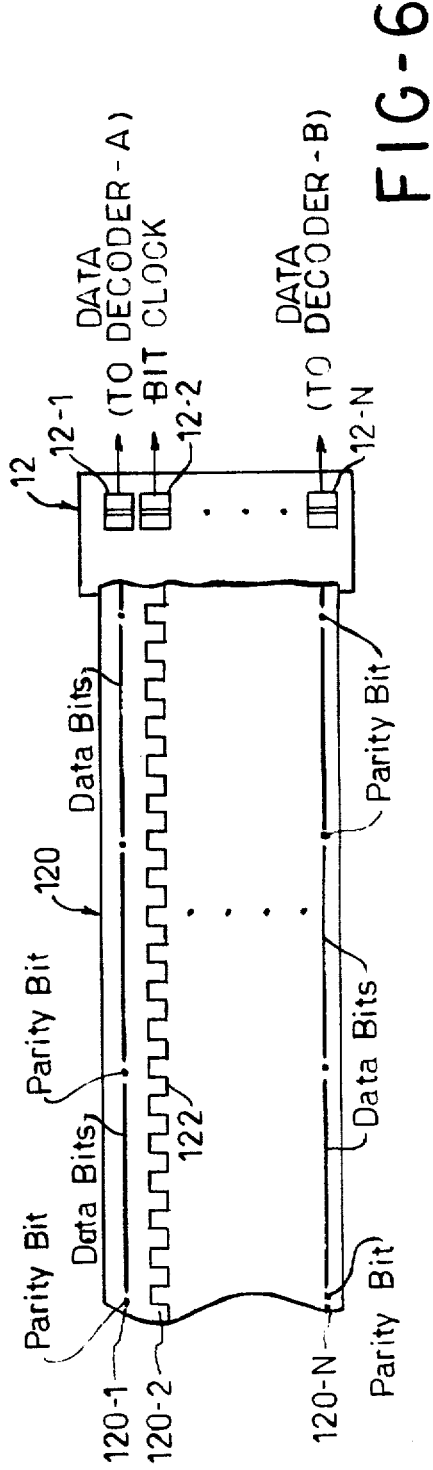
FIG. 6 is a fragmentary plan view of plural channel recording tape which includes a bit clock recorded along one track thereof which also may be used in skew detecting means embodying the present invention.

With the present skew measuring and/or correction circuit two digital data streams of equal length words with a parity bit are simultaneously recorded along two tracks of a multitrack tape. On playback, word clock signals are produced in synchronization with the parity bits by use of the parity bit lock-on circuits. If data to be recorded along tracks 10-1 and 10-N of the tape is encoded using a code which is not self-clocking, a bit clock may be simultaneously recorded along another track for clocking the bits from the tape. In FIG. 6 an arrangement is shown wherein data, comprising equal length words with parity bits, is recorded along the outer tracks of a tape 120, and bit clock signal 122 is recorded along another track, here track 120-2. On playback, the encoded data from elements 12-1 and 12-N of the playback head is supplied to decoders A and B, not shown, along with the bit clock from element 12-2. Outputs from the decoders A and B are supplied to parity bit lock-on circuits, such as 32-1 and 32-N shown in FIG. 1. Except for the need for a bit clock signal track and decoders which are clocked using the output obtained therefrom, the arrangement is the same as that shown in FIG. 1 and described above.

The invention having been described in detail in accordance with requirements of the Patent Statutes, various other changes and modifications will suggest themselves to those skilled in this art. For example, the automatic skew control system is not limited to use with the mechanical linkage illustrated in FIG. 5, numerous linakges suitable for this use being known in the prior art. Also, the invention may be incorporated in a system wherein the transducing head is stationary and skew adjustment is effected by control of the tape relative to the head. Obviously, other tracks than the two outside tape tracks may be used in the production of the skew control and/or indicating signal. Also, other parity bit lock-on circuits may be employed in the present skew detecting system, the invention not being limited to the circuit shown herein. Also, gated sample and hold circuits could be employed in the output from the low pass filter 84 which function to hold the last value of the filter output upon loss of lock-on of either parity bit lock-on circuit 32-1 and 32-N, in which case, the filter output would be maintained for a short time period during the search for parity. It is intended that the above and other such changes and modifications shall fall within the spirit and scope of the invention defined in the appended claims.

We claim:

1. In a playback system for magnetically reproducing digital data signals which include parity bit signals recorded along parallel tracks of a plural track magnetic recording medium, the combination comprising,
a transducing head having a transducing element for each of said plurality of tracks for reproducing signals recorded along said tracks, and
means for detecting phase shifts between parity bit signals reproduced from two of said tracks.

2. In a playback system as defined in claim 1 including,
indicating means responsive to said phase detecting means for visual indication of the phase difference between parity bit signals.

3. In a playback system as defined in claim 1 including,
a servomotor for controlling the positional relationship between said transducing head and recording medium, and
means for applying the output from said phase detecting means as an error signal to said servomotor to automatically reduce said phase shifts.

4. In skew sensing apparatus for a playback system which includes a recording medium with first and second spaced tracks upon which are recorded equal length digital data words having substantially simultaneously recorded parity bits, and associated reproducing transducing head means including first and second transducer elements for reading signals from said respective first and second tracks, the combination comprising
first and second means responsive to outputs from said first and second transducer elements for generating word clock signals in synchronism with parity bit signals in said respective outputs, and
phase detecting means responsive to outputs from said first and second word clock generating means and having an output related to skew.

5. In skew sensing apparatus as defined in claim 4 wherein said first and second means responsive to outputs from said first and second transducing elements each include means for locking onto parity bit signals included in the output from the associated transducing element and for generating a parity bit lock-on signal when locked onto said parity bit signals, and
means under control of said parity bit lock-on signals for inhibiting the output from said phase detecting means when either said first or second means responsive to outputs from said first and second transducing elements is not locked onto parity bit signals.

6. In skew sensing apparatus as defined in claim 5 wherein said first and second means responsive to outputs from said first and second transducing elements include data outputs adapted for connection to first and second data utilization circuits together with said parity bit lock-on signals therefrom.

7. In skew sensing apparatus as defined in claim 4 wherein said recording medium comprises magnetic tape having a plurality of parallel tracks thereon including said first and second tracks, said transducing head means having at least one transducing element for each track including said first and second transducing elements.

8. In skew sensing apparatus as defined in claim 4 including visual indicating means responsive to the output from said phase detecting means for visual indication of skew.

9. In skew sensing apparatus as defined in claim 4 including servomotor means responsive to the output from said phase detecting means, and
mechanical linkage coupling the servomotor means to the transducing head means for automatic azimuthal adjustment of the transducing head means for minimizing the phase difference between the word clock signals coupled to the phase detecting means.

10. In a plural channel playback system for reproducing information recorded along parallel tracks of a recording tape, at least two of said tracks having been recorded with equal length digital data words having substantially simultaneously recorded word parity bits, the combination including

- a reproducing transducer head having at least one transducer element for each tape track,
- means for generating word clock signals from said two tracks recorded with said equal length digital data words, which clock signals are synchronized with parity bits included in said data words
- means for producing an error signal in response to the phase difference between word clock signals from said generating means, and
- means for relative azimuthal adjusting of the reproducing transducer head and tape to minimize the error signal.

11. In a plural channel playback system as defined in claim 10 including

- visual indicating means responsive to said error signal for visual display thereof and wherein
- said adjusting means is manually operated.

12. In a plural channel playback system as defined in claim 10 wherein said adjusting means includes a servomotor responsive to the error signal for automatic relative azimuthal adjustment of the reproducing transducer head and tape for dynamic minimization of the error signal.

13. In a plural channel playback system as defined in claim 10 wherein information recorded on said two tracks is in encoded form, the system including,

- decoding means responsive to outputs from the transducer elements for said two tracks for decoding the encoded information from along said tracks, and
- means for connecting decoded signal outputs from said decoding means to said word clock generating means.

14. In a plural channel playback system comprising

- a magnetic recording medium having a plurality of parallel tracks thereon, at least first and second tracks of said plurality of tracks having data signals recorded thereon comprising equal length digital data words with a parity bit, and
- a reproducing transducing head having at least one transducing element for each of said plurality of tracks, the method of operating said system comprising,

- generating first and second word clock signals from the digital data word recorded along said respective first and second tracks in synchronization with the parity bits,
- producing an error signal in response to said first and second word clock signals, and
- adjusting the azimuthal position of the reproducing head relative to the recording medium to minimize the error signal.

15. In a plural channel playback system as defined in claim 14 including

- word clocking digital data signals obtained from said first and second tracks using said generated first and second word clock signals.

16. In a plural channel playback system as defined in claim 14 wherein the data signals recorded along said first and second tracks are in encoded form, the method including

- decoding the encoded data signals recorded along said first and second tracks, said first and second word clock signals being generated from said decoded data signals.

17. In a plural channel playback system as defined in claim 14 wherein the adjusting step includes supplying said error signal to a servomotor coupled to said reproducing transducing head for automatic azimuthal adjustment of said head relative to said recording medium.

* * * * *